United States Patent [19]

Chida et al.

[11] Patent Number: 5,037,475

[45] Date of Patent: Aug. 6, 1991

[54] COLORED METALLIC PIGMENT, METHOD FOR THE PRODUCTION OF SAME AND PRODUCTS CONTAINING SAME

[75] Inventors: Kyoichi Chida, Tokyo; Takuya Uemura, Nara; Hiroshi Kitamura, Gose; Hideto Nitta, Gojo, all of Japan

[73] Assignee: Showa Alumi Powder K.K., Nara, Japan

[21] Appl. No.: 366,981

[22] Filed: Jun. 16, 1989

[30] Foreign Application Priority Data

Jun. 16, 1988 [JP] Japan .................................. 63-148505

[51] Int. Cl.$^5$ ........................... C09C 1/64; C09C 3/04
[52] U.S. Cl. .................... 106/403; 106/262; 106/266; 106/404; 428/403; 523/205
[58] Field of Search ............... 106/403, 404, 266, 262; 523/205; 428/403

[56] References Cited

U.S. PATENT DOCUMENTS 4,115,338 9/1978 Kobayashi et al. ................. 523/205
4,484,951 11/1984 Uchimura et al. .................. 106/404

FOREIGN PATENT DOCUMENTS 54-52134 4/1979 Japan .
58-141248 8/1983 Japan .

Primary Examiner—William R. Dixon, Jr.
Assistant Examiner—Anthony J. Green
Attorney, Agent, or Firm—Sughrue, Mion, Zinn, Macpeak & Seas

[57] ABSTRACT

A colored metallic pigment comprising a metallic pigment, a coloring pigment, and a thermally polymerized carboxylic acid having at least one double bond and at least two carboxylic groups prepared by the thermal polymerization of at least one double bond-containing carboxylic acid, the coloring pigment being chemically adsorbed on the surface of the metallic pigment via the thermally polymerized carboxylic acid. The colored metallic pigment may be coated with a polymer composed of a radical polymerizable unsaturated carboxylic acid and a monomer having at least three radical polymerizable double bond. A bright paint, bright ink and bright plastics which contain the colored metallic pigment are also disclosed.

20 Claims, No Drawings

COLORED METALLIC PIGMENT, METHOD FOR THE PRODUCTION OF SAME AND PRODUCTS CONTAINING SAME

BACKGROUND OF THE INVENTION

1. Field of the Invention

The present invention relates to primary colored metallic pigments which are used in kneading into plastics and have metallic bright color touch or secondary colored metallic pigments which are used in paints and are resistant to water and chemicals and have excellent metallic bright color touch, and to a method for the production of the same. The present invention also relates to products or compositions containing the metallic pigments such as paints, inks, plastics, etc.

2. Description of Prior Art

Metallic pigments such as fine aluminum powder have been used widely in order to obtain metallic-feeling decorative effects, and colored metallic pigments having various color tones have been developed.

Generally, the colored metallic pigments are composed of metallic pigments and resin coatings formed on the surface thereof and containing coloring pigments. For example, the colored metallic pigments are produced by co-dispersing a metallic pigment and a coloring pigment in a solution of a solvent-soluble resin in a volatile solvent, spraying and drying the resulting mixture to form resin coatings containing the coloring pigment on the surface of the metallic pigment, or by mixing a double bond-containing monomer, a metallic pigment and a coloring pigment in a solvent in which the double bond-containing monomer is soluble but the polymer obtained by the polymerization of the monomer is insoluble, adding a polymerization initiator to the mixture, polymerizing the monomer to form a layer of the coloring pigment on the surface of the metallic pigment.

Further improvement of the colored metallic pigments is desired in order to improve resistance to water and chemicals without deteriorating the metallic color touch.

SUMMARY OF THE INVENTION

As the results of intensive research, it has now been found that when coloring pigments are chemically adsorbed on metallic pigments via a polymer of a carboxylic acid having at least one double bond and at least two carboxyl groups and being obtained by the thermal polymerization of at least one carboxylic acid having a double bond (hereinafter, "thermally polymerized carboxylic acid"), the coloring pigments are adsorbed firmly to form an independent layer of the coloring pigment on the surface of the metallic pigment.

The present invention is based on the above discovery and provides a primary colored metallic pigment comprising a metallic pigment, a coloring pigment, and a thermally polymerized carboxylic acid having at least one double bond and at least two carboxylic groups prepared by the thermal polymerization of at least one double bond-containing carboxylic acid, the coloring pigment being chemically adsorbed on the surface of the metallic pigment via the thermally polymerized carboxylic acid.

The present invention also provides a secondary colored metallic pigment comprising (a) a primary colored metallic pigment comprising a metallic pigment, a coloring pigment, and a thermally polymerized carboxylic acid having at least one double bond and at least two carboxylic groups prepared by the thermal polymerization of at least one double bond-containing carboxylic acid, the coloring pigment being chemically adsorbed on the surface of the metallic pigment via the thermally polymerized carboxylic acid, and (b) a polymer composed of a radical polymerizable unsaturated carboxylic acid and a monomer having at least three radical polymerizable double bonds, the primary colored metallic pigment (a) being coated with the polymer (b).

In another aspect, the present invention provides a method for the production of a primary colored metallic pigment, comprising a) agitating a thermally polymerized carboxylic acid having at least one double bond and at least two carboxylic groups prepared by the thermal polymerization of at least one double bond-containing carboxylic acid, and a metallic pigment in an organic solvent, b) filtering the mixture to obtain a cake, c) mixing the cake and a coloring pigment in an organic solvent, and d) removing excessive organic solvent.

Also, the present invention provides a method for the production of a secondary colored metallic pigment, comprising a') adding a radical polymerizable unsaturated carboxylic acid to the the above-mentioned primary colored metallic pigment while dispersing and agitating the mixture in an organic solvent, b') adding a monomer having at least three radical polymerizable unsaturated double bonds and a polymerization initiator to the mixture and polymerizing the resulting mixture, and c') removing excessive organic solvent.

The primary colored metallic pigment of the present invention has a sharp color and is excellent in metallic color touch, and plastics in which the primary colored metallic pigment is kneaded have an excellent color touch. Also, the secondary colored metallic pigment of the present invention exhibits excellent resistance to water and chemicals since the primary colored metallic pigment used is coated with a resin having a three dimensional construction, and paints containing the secondary colored metallic pigment can form coating layers having a gorgeous color touch. Thus, the primary and secondary colored metallic pigments of the present invention are advantageous in many practical applications such as bright paints, bright inks and bright plastics.

DETAILED DESCRIPTION OF THE INVENTION (1) Primary Colored Metallic Pigment

In the primary colored metallic pigment of the present invention, the coloring pigment is chemically adsorbed on the surface of the metallic pigment via the thermally polymerized carboxylic acid.

The primary colored metallic pigment can be produced by agitating the thermally polymerized carboxylic acid and the metallic pigment in the organic solvent, filtering the mixture to form a cake, mixing the cake and the coloring pigment by kneading or agitating them in the presence of the organic solvent, and removing excessive organic solvent.

In the colored metallic pigments of the present invention, the thermally polymerized carboxylic acid is chemically adsorbed on the surface of the respective grains in the metallic pigment, and the coloring pigment is adsorbed by the thus chemically adsorbed carboxylic acid, resulting in that the coloring pigment is not diluted, and the primary colored metallic pigment produced has a deep color because it forms a layer.

Examples of the metallic pigment which can be used in the production of the primary colored metallic pigment of the present invention include pure metal elements such as Al, Zn, Fe, Ni, Sn, Cu and Ag or their alloys. In practice, Al, which has a wide application as a silver color pigment, is mainly used although Zn, Sn, Cu and the like are also used but less frequently.

In the present invention, the metallic pigment can be used mainly in the form of powder or paste having a shape of scaly flakes or spherical atomized powder. Preferably, it is composed of grains having smooth surfaces and giving less irregular reflection. The grain size of the metallic pigment may vary depending on the purpose for which colored metallic pigment is used.

In the case of aluminum pigment, fatty acids such as oleic acid, stearic acid, etc. are added when grinding it. Al paste in which the respective Al grains are coated with the fatty acid have not been oxidized on the surface thereof, and the thermally polymerized carboxylic acid has been substituted for the fatty acid used upon grinding and chemically adsorbed on the surface of Al, which is advantageous.

The coloring pigment which can be used in the present invention may be any organic or inorganic pigments that do not dissolve in organic solvents to be used as far as it can be adsorbed by the metallic pigment treated with the thermally polymerized carboxylic acid.

Specific examples of the organic pigment which can be used in the present invention include azo lake pigments such as Brilliant Carmine 6B, Lake Red C, Permanent Red 2B and Bordeau 10B; insoluble azo pigments such as Brilliant Fast Scarlet, Fast Yellow ER, Naphthol Red HFG, Fast Yellow FGL, Disazo Yellow HR and Pyrazolone Orange; condensed azo pigments such as Chromophthal Yellow GR, Chromophthal Orange 4R, Chromophthal Red 144, Chromophthal Scarlet RN and Chromophthal Brown 5R; phthalocyanine pigments such as Phthalocyanine Blue and Phthalocyanine Green; threne pigments such as anthrapyridine Yellow, Flavanthrone Yellow, Acylamide Yellow, Pyranthrone Orange, Anthoanthrone Orange, Dianthraquinyl Red, Isoviolandrone Blue and Indanthrone Blue; indigo pigments such as Indigo Blue, Thioindigo Bordeau and Thioindigo Magenta; perinone pigments such as Perinone Orange and Perinone Red; perylene pigments such as Perylene Red, Perylene Scarlet, Perylene Marine and Perylene Brown; phthalone pigments such as Quinophthalone; dioxazine pigments such as Dioxazine Violet; quinacridone pigments such as Quinacridone Red, Quinacridone Magenta, Quinacridone Scarlet and Quinacridone Marine; isoindolinone pigments such as Isoindolinone Yellow, Isoindolinone Red and Isoindolinone Orange; metal complex pigments such as Nickel Dioxine Yellow, Copper Azomethine Yellow and Nickel Azo Yellow, and the like.

Examples of the inorganic pigments which can be used in the present invention include chrome yellow, yellow iron oxide, red iron oxide, black iron oxide, cobalt blue, carbon black and titanium oxide.

Examples of the organic solvent which can be used in the present invention include aliphatic hydrocarbons such as hexane, heptane, octane and mineral spirit; aromatic hydrocarbons such as benzene, toluene, solvent naphtha and xylene; esters such as ethyl acetate and butyl acetate; ethers such as tetrahydrofuran and diethyl ether; and the like. Usually, these organic solvents can be used alone or as a mixture with each other. When the secondary colored metallic pigment is produced, it is preferred to use the same organic solvent as used in the production of the primary colored metallic pigment.

As for the thermally polymerized carboxylic acid, there can be used, for example, thermally polymerized carboxylic acids obtained by the thermal polymerization of linseed oil fatty acid or soybean oil fatty acid and those obtained by the thermal polymerization of linseed oil fatty acid or soybean oil fatty acid with acrylic acid.

The amount of the thermally polymerized carboxylic acid used may vary depending on the surface area of the metallic pigment to be used and on the amount of the coloring pigment to be used upon producing the primary colored metallic pigment. Preferably, the amount of the thermally polymerized carboxylic acid is from 0.2 to 10 parts by weight, particularly from 1 to 6 parts by weight, per 100 parts by weight of metallic pigment having a specific surface are of 1 $m^2/g$.

In order to produce the primary colored metallic pigment of the present invention using the above-described raw materials, at first the metallic pigment and the thermally polymerized carboxylic acid are added to the organic solvent and the temperature is elevated, and the mixture is agitated sufficiently. The amount of the organic solvent to be used does not have to be determined strictly, and it is sufficient to use it in amounts which enable vigorous agitation and uniform adsorption of the thermally polymerized carboxylic acid on the surface of the metallic pigment. Usually, the metallic pigment is used in an amount of from about 10 to about 25 parts by weight per 100 parts by weight of the organic solvent. The temperature is preferably from about 50° C. to about 150° C. If the temperature is above 150° C., the chemical adsorption rate is too high to perform uniform adsorption. Meanwhile, if the temperature is below 50° C., the chemical reaction does not occur and no adsorption is obtained. The period of time in which adsorption is performed tends to be shorter according as the reaction temperature increases and is selected appropriately.

After the above-described operation, the mixture is filtered using a filter-press or the like to recover a metallic pigment having formed on the surface thereof a layer of the thermally polymerized carboxylic acid (hereafter, referred to as "thermally polymerized carboxylic acid-treated metallic pigment") as a filter cake.

Then, the thus-recovered thermally polymerized carboxylic acid-treated metallic pigment (a) and the coloring pigment (b) are dispersed and agitated together with the organic solvent using a pot mill (small ball mill) containing chromium steel ball or the like.

The optimum conditions under which the dispersion and agitation of the coloring pigment are performed may vary depending on the kind of the coloring pigment to be used. Usually, it is sufficient to use about 1 to about 5 parts by weight of the organic solvent per part by weight of the coloring pigment. Better dispersion can be obtained by the addition of the pigment dispersant in an amount of 0.02 part by weight per part by weight of the coloring pigment.

When the amount of the organic solvent which is mixed with the metallic pigment for dispersion is too large, the chemical adsorption of the coloring pigment on the thermally polymerized carboxylic acid-treated metallic pigment is poor, and when that amount is too small, mixing and agitation are difficult.

As described above, the organic solvent is contained in the paste of the thermally polymerized carboxylic acid-treated metallic pigment and also it is used in the dispersion and agitation of the coloring pigment. It is preferred to use the organic solvent in a total amount of 10 to 200 parts by weight per 100 parts by weight of the metal content of the metallic pigment inclusive of one used in the paste and another used in the dispersion.

The amount of the coloring pigment to be used for the coloring of the metallic pigment may vary depending on the surface area of the metallic pigment used. Actually, the surface area of the metallic pigment has an inverse correlationship with the grain size thereof and therefore the grain size is used in practice in place of the surface area. In the case of an aluminum pigment having a mean grain size of 22 $\mu$m and a WCA (water covering area) of 7,400 $cm^2/g$, the amount of the coloring pigment is preferably from 1 to 50 parts by weight, particularly from 5 to 20 parts by weight, per 100 parts by weight of the metal content of the metallic pigment. When the content of the coloring pigment is below 1 part by weight the color touch is poor, and on the other hand, when it is above 50 parts by weight, the amount of adsorption is too large to retain metallic feeling and non-adsorbed coloring pigment remains, which is economically disadvantageous.

When the mean grain size of the metallic pigment is larger than the above-described value, the surface area is smaller and the amount of the coloring pigment to be used decreases accordingly. On the contrary, when the mean grain size is smaller than the above-described value, the surface area of the metallic pigment is larger and the amount of the coloring pigment increases accordingly.

Instead of the operation of agitating the mixture in the above-described container, the adsorption operation can be performed by dispersing and mixing the coloring pigment using the pot mill and adding the thermally polymerized carboxylic acid-treated metallic pigment. In this case, the amount of the organic solvent may be reduced to minimum.

When the primary colored metallic pigment obtained by the above method is used as a pigment, the organic solvent is removed from the product before it is used. On the other hand, when it is used as a raw material for the production of the secondary colored metallic pigment of the present invention, the product may be used as it is without removing the organic solvent therefrom.

In both cases, non-adsorbed coloring pigment can be removed by decantation or a like operation using an organic solvent. The same solvent as described above may be used for this purpose.

When the primary colored metallic pigment thus produced is vigorously agitated upon producing paints or the composition for use in the production of paints, the chemically adsorbed coloring pigment tends to desorb from the primary colored metallic pigment.

Although the primary colored metallic pigment of the present invention is useful as it is in any applications such as production of paints as far as no vigorous agitation is involved or no desorbant is used. In particular, since the primary colored metallic pigment of the present invention has no resin coating and therefore its surface is smooth, it is suited for writing inks. The inks containing it have a satisfactory flowability and no clogging of inks occurs. Furthermore, when it is used in screen printing, it passes through the screen smoothly. No reduction in the light reflection ratio which would otherwise be observed due to the presence of a resin coating layer does occur, giving metallic feeling more excellent than the secondary colored metallic pigment. When the primary colored metallic pigment of the present invention is incorporated in plastics, those having a splendid hue can be obtained.

(2) Secondary Colored Metallic Pigment

The primary colored metallic pigment may be further coated with the polymer having a three dimensional construction, which is derived from the radical polymerizable unsaturated carboxylic acid and the monomer having at least three radical polymerizable double bonds so that the resulting secondary colored metallic pigment produced has resistance to water and chemicals without deteriorating the metallic bright color touch.

The secondary colored metallic pigment can be used as a pigment in various applications where vigorous agitation is involved or desorbants are contained, and it can also be used as a raw material for producing paints that show excellent resistance to water and chemicals and have excellent metallic color feeling.

The secondary colored metallic pigment of the present invention is composed of the above-described primary colored metallic pigment and the polymer derived from the monomer having at least three radical polymerizable unsaturated double bonds and radical polymerizable unsaturated carboxylic acid, the primary colored metallic pigment being coated with the polymer.

The secondary colored metallic pigment can be produced by agitating the thermally polymerized carboxylic acid and the above-described primary metallic pigment in the organic solvent, filtering the mixture to form a cake, mixing the cake and the coloring pigment by kneading or agitating them in the presence of the organic solvent, adding the radical polymerizable unsaturated carboxylic acid and then the monomer having at least three radical polymerizable double bonds and a polymerization initiator while dispersing and agitating the mixture in the organic solvent to effect polymerization, and removing excessive organic solvent from the reaction mixture.

Examples of the radical polymerizable unsaturated carboxylic acid which can be used in producing the secondary colored metallic pigment include acrylic acid, methacrylic acid, itaconic acid and fumaric acid. These carboxylic acids can be used alone or as a mixture.

Examples of the monomer having at least three radical polymerizable double bonds include trimethylolpropane triacrylate, trimethylolpropane trimethacrylate, tetramethylolmethane triacrylate and tetramethylolmethane tetraacrylate.

As for the polymerization initiator, there can be used any known free radical initiators that include, for example, peroxides such as benzoyl peroxide, lauroyl peroxide, isobutyl peroxide and methyl ethyl ketone peroxide, and azobisisobutyronitrile.

Upon producing the secondary colored metallic pigment, the primary colored metallic pigment is added to a sufficient amount of the organic solvent that enables satisfactory agitation, and after adding the radical polymerizable unsaturated carboxylic acid and then the monomer having at least three radical polymerizable double bonds and the polymerization initiator while vigorously agitating the mixture to effect polymerization. The amount of the radical polymerizable unsaturated carboxylic acid and that of the monomer having at least three radical polymerizable double bonds are each from 0.1 to 10 parts by weight per 100 parts by weight of the metal content in the primary colored metallic pigment. In addition, the amount of the polymerization initiator is from 0.1 20 parts by weight per 100 parts by weight of the above-described monomer. By the above-described polymerization operation, the primary colored metallic pigment is coated with a layer of the resin which is highly cross-linked to form three dimensional construction, to give secondary colored metallic pigment which is stable in water and is excellent in resistance to chemicals. When the amount of the organic solvent is too small, the viscosity of the reaction mixture becomes too high to coat every grains of the colored metallic pigment with the resin and as the result a plurality of grains are coated with the resin in overlapping state without being coated individually, which causes generation of acne or seeding when the secondary colored metallic pigment is formulated into paints. On the other hand, when the amount of the organic solvent is too large, the efficiency of production decreases. Excessive organic solvent can be removed by filtration, drying or the like operation.

In the above reaction, it is preferred to purge the reaction atmosphere with an inert gas such as nitrogen gas or argon gas. It is preferred that the monomer having at least three radical polymerizable double bonds and the polymerization initiator are introduced after not shorter than 5 minutes from the addition of the radical polymerizable unsaturated carboxylic acid in order to obtain a cross-linked polymer having good adhesion. The polymerization temperature may vary depending on the kind of the polymerization initiator used, and usually it ranges from 30° to 150° C. The reaction time may be selected appropriately, and usually it ranges from 30 minutes to 10 hours.

If the above-described polymerization reaction is performed with the monomer having at least three radical polymerizable double bonds and the polymerization initiator alone without using the radical polymerizable unsaturated carboxylic acid, the viscosity of the reaction system increases too much to effect the agitation of the reaction system, and a stable, strong coating layer is not obtained. This means it is necessary to coat or cover the surface of the primary colored metallic pigment with the radical polymerizable unsaturated carboxylic acid prior to contacting with the monomer.

The primary or secondary colored metallic pigments of the present invention can be used as a pigment in various applications such as bright paints, bright inks and bright plastics.

(3) Bright Paints

The primary or secondary colored metallic pigment of the present invention can be used in the production of bright paints. The pigment is dispersed in a solvent together with a binder for paints.

Colored metallic paints containing the primary or secondary colored metallic pigment of the present invention can be produced by mixing 0.1 to 60 parts by weight of the colored metallic pigment described above per 100 parts by weight of the resin for paints and a necessary amount of a thinner or organic solvent for dilution. When the content of the primary or secondary colored metallic pigment is smaller than 0.1 part by weight, metallic color feeling necessary for the colored metallic pigment is unsatisfactory. On the other hand, when it is used in an amount larger than 60 parts by weight, not only the amount of the primary or secondary colored metallic pigment in the paint is too large to ensure efficient painting operation but also the physical properties of the coating layer formed are poor so that the paint obtained is practically unacceptable.

It is preferred to use the primary colored metallic pigment of the present invention in an amount of from 0.1 to 50 parts by weight per 100 parts by weight of the binder or resin for paints. On the other hand, it is preferred to use the secondary colored metallic pigment of the present invention in an amount of from 1 to 60 parts by weight per 100 parts by weight of the resin for paints.

As for the binder or resin for paints, any conventional ones that have been used in paints can be used. In addition, those resins can also be used which have not been used in conventional metallic paints containing a large amount of functional groups and tending to cause gelation. Examples of such resins include acrylic resins, alkyd resins, oil-free alkyd resins, polyvinyl chloride resins, polyurethane resins, melamine resins, unsaturated polyester resins, urea resins, cellulose resins and epoxy resins. These resins can be used alone or as a mixture.

Specific examples of the binder which can be used in the bright paint of the present invention include natural resins such as copal, shellac and rosin; processed natural resins such as ester gum, decolored shellac, hardened rosin, molten copal and bleached lac; non-modified alkyd resins; modified alkyd resins, e.g., fatty acid-modified alkyd resins modified with a fatty acid such as linseed oil, soybean oil or oil of tolu balsam; polybasic acid-modified alkyd resins modified with a polybasic acid such as phthalic anhydride, terephthalic acid or succinic acid; polyhydric alcohol-modified alkyd resins modified with a polyhydric alcohol such as glycerol, pentaerythritol or trimethylolpropane; modified alkyd resins such as phenol-modified alkyd resins, styrenylated alkyd resins, acrylate-modified alkyd resins, vinylated alkyd resins, urethanated alkyd resins, epoxylated alkyd resins, and oil free-alkyd resins; amino resins, e.g., melamine resins, benzoguanamine resins, butyric etherated melamine resins, methyl etherated melamine resins, aminoalkyd co-condensed resins, urea resins, butyl etherated urea resins; vinyl resins, e.g., polyvinyl chloride resins, vinyl chloridevinyl acetate copolymers, polyvinylidene chloride resins, polyvinyl acetate resins, polyvinyl alcohol resins and butyral resins; acrylic resins, e.g., thermoplastic acrylic resins and thermosetting acrylic resins; epichlorohydrin, bisphenol A type resins; phenol novolak type resins; bromine type resins; glycidyl ether type resins; glycidyl ester type resins; polyglycol ether type resins; .epoxy resins, e.g., epoxylated polybutadienes and epoxyacrylates; polyamides resins, isocyanate compounds; urethane resins, e.g., oil-modified polyurethane resins; unsaturated polyester resins; phenol resins, e.g., 100% phenol resins, rosin-modified phenol resins and epoxy-modified phenol resins; synthetic resin emulsions, e.g., vinyl acetate emulsions, acrylic emulsions and epoxy resin emulsions; chlorinated polyolefins, e.g., chlorinated polyethylene, chlorinated polypropylene and chloride rubber; maleic acid resins; cumarone resins; xylene resins; petroleum resins; silicone resins; fluororesins; ketone resins; polybutadiene resins; nitrocellulose resins; cellulose acetate resins; methyl cellulose, and the like.

Examples of the solvent for paints or thinner which can be used in the present invention include petroleum hydrocarbons such as normal hexane, industrial gasoline, kerosene, mineral spirit, toluene, xylene, solvent naphtha, tetrahydronaphthalene, terpene oil and methylcyclohexane; chlorinated hydrocarbons such as methylene chloride, trichloroethylene, perchloroethylene and orthodichlorobenzene; alcohols such as methanol, ethanol, isopropanol, normal butanol, isobutanol, secondary butanol, tertiary butanol, methyl isobutyl carbinol and cyclohexanol; ethers such as methyl cellosolve, cellosolve, butyl cellosolve, tertiary butyl cellosolve, 3-methyl-3-methoxybutanol, methoxybutanol, diethylene glycol monomethyl ether, diethylene glycol monoethyl ether, diethylene glycol monobutyl ether and dioxane; esters such as methyl acetate, ethyl acetate, isopropyl acetate, butyl acetate, isobutyl acetate, amyl acetate, methyl cellosolve acetate, cellosolve acetate, butyl cellosolve acetate, methoxybutyl acetate, carbitol acetate and propylene glycol monomethyl ether; ketones such as acetone, methyl ethyl ketone (MEK), methyl isobutyl ketone (MIBK), cyclohexanone, diacetone alcohol (DAA), diisobutyl ketone (DIBK) and isophorone; dimethyl formamide (DMF); and the like. These solvents can be used alone or as a mixture. However, it is preferred to use two or more of them in combination, determining the composition thereof taking into consideration solubility and film-forming property of the resins for paints, the operability of painting, etc.

In order to give flexibility, aging resistance, and brittle resistance at low temperature to coating layers, there can suitably be used various plasticizers, e.g., phthalic acid derivatives such as diethyl phthalate, dibutyl phthalate, diisobutyl phthalate, dioctyl phthalate, butyl benzyl phthalate, methylphthalyl ethyl glycolate, ethylphthalyl ethyl glycolate and butylbenzyl phthalyl butyl glycolate; phosphate derivatives such as tricresyl phosphate, triphenyl phosphate, and diphenylcresyl phosphate; derivatives of fatty acids such as oleic acid and stearic acid; trimellitate, sebacic acid, azelaic acid, adipic acid derivatives; epoxy derivatives; polyester derivatives; and the like, if desired.

In addition, various additives can be used, if desired, which include pH regulator for aqueous paints, hardeners, polymerization initiators, desiccants, hardening catalysts, cross-linking agents, anti-foaming agents, anti-segregation and anti-shading agents, dyestuffs, surfactants, tackifiers, wetting agents, anti-settling agents, anti-sagging agents, anti-septics, ultraviolet stabilizers, flame retardants, and the like.

The bright paint of the present invention can be coated, for example, using spatula or brush, or by air spraying, roller coating, electrostatic deposition, dipping, etc.

(4) Bright Inks

Bright inks can be obtained by uniformly dispersing the primary or secondary colored metallic pigment of the present invention described above together with a binder in an organic solvent or aqueous solvent.

The size of the metallic grains in the primary or secondary colored metallic pigments used in the present invention may vary depending on the kind of ink to be produced, and generally those having a length of 0.5 to 200 $\mu$m, a width of 0.5 to 200 $\mu$m, and a thickness of 0.3 to 5 $\mu$m are used for producing printing inks. When the length and width are smaller than 0.5 $\mu$m, respectively, the reflection area is small so that brightness is almost lost. On the other hand, when they are larger than 200 $\mu$m, respectively, the resulting inks cannot be used in gravure printing. In the case of writing inks, it is preferred that the length and width of the metallic grains in the colored metallic pigments be smaller than 20 $\mu$m, respectively. When they exceed 20 $\mu$m, the weight of the metallic grains is large, resulting in the deterioration of the flowability and shelf life of the inks, which causes scratching or clogging of the ink. For similar reasons, the thickness of the metallic grains is preferably smaller than 1 $\mu$m.

The amount of the primary or secondary colored metallic pigment in printing inks is preferably from 0.1 to 60% by weight based on the weight of the ink. When it is smaller than 0.1% by weight, it is too small to attain a satisfactory coverage, while the dispersibility of the pigment is low and increase in the viscosity is too high to perform printing when the amount of the pigment is larger than 60% by weight. On the other hand, in the case of writing inks, the pigment is contained in the ink in an amount of preferably from 10 to 60% by weight based on the weight of the ink. When the content of the pigment is smaller than 10% by weight, the pigment is difficult to uniformly distribute in the ink and written letters tend to appear spotted and metallic luster also appears to be spotted, while the flowability of the ink decreases to cause scratching or clogging of the ink when the content of the pigment is smaller than 60% by weight.

As for the binder, there can be used rosin-modified polymaleic acid resins, polymerized rosins, polymaleic acid resins, polyvinyl alcohol, gum arabic, vegetable oil, polyamide resins, ethyl cellulose, and the like.

Examples of the solvent which can be used in the ink of the present invention include ethyl cellosolve, butyl cellosolve, isopropyl alcohol, butyl alcohol, butyl acetate, methyl isobutyl ketone, glycerol, hexylene glycol, toluene, water, and mixtures thereof.

Various conventional additives such as plasticizers, dispersants, stabilizers, viscosity controlling agents and surfactants may be added to the ink composition of the present invention, if desired.

Mainly in the case of printing inks, extender or filler such as silica gel and magnesium carbonate may be added.

The ink composition of the present invention retains brightness ascribable to the respective metallic pigment grains over a wide range of color tone.

(5) Bright Plastics

The primary or secondary colored metallic pigment of the present invention can be mixed with plastics to obtain bright plastics.

Generally, the primary colored metallic pigment of the present invention is used in an amount of 0.1 to 50 parts by weight per 100 parts by weight of the resulting plastics. On the other hand, the secondary colored metallic pigment of the present invention is used in an amount of 0.1 to 60 parts by weight per 100 parts by weight of the resulting plastics. If the amount of the colored metallic pigment is below 0.1 part by weight per 100 parts by weight of the resulting plastics, the plastics does not exhibit brightness or luster. In the case of the primary colored metallic pigment, if it is contained in an amount of above 50 parts by weight per 100 parts by weight of the resulting plastics, not only the moldability of the plastics is deteriorated but also the mechanical strength of the molded articles obtained decreases. The secondary colored metallic pigment shows the same behavior as the primary colored metallic pigment in an amount above 60 parts by weight per 100 parts by weight of the resulting plastics.

Examples of the plastics which can be used in the present invention include crystalline thermoplastic resins such as cellulose plastics, high density polyethylenes, low density polyethylenes polypropylenes, polyamides, polycarbonates, polyacetals, polyphenylene sulfides, polyvinylidene chloride resins and polyethylene terephthalate resins; non-crystalline thermoplastic resins such as polyvinyl chloride resins, polyvinyl alcohol resins, polyvinyl butyral resins, polystyrenes, ABS resins, methacrylic resins, polyphenylene oxides, polyurethanes and ionomer resins; thermosetting resins such as phenol resins, urea resins, melamine resins, unsaturated polyester resins, diallyl phthalate resins, epoxy resins, silicone resins, alkyd resins and polyimides.

Various additives such as plasticizers, ultraviolet absorbents, anti-aging agents, lubricants, and other coloring agents can also be used, if desired.

The bright plastics of the present invention can be produced by molding a resin composition composed of a base resin and the bright colored pigment of the present invention blended in the base resin, for example, by cast molding, injection molding, extruding, blowing, transfer molding, film forming, cold press molding, and the like molding processes.

When producing the bright plastics of the present invention, it is advantageous to prepare so-called master batches which are composed of a base resin and the colored metallic pigment as a brightening and coloring pigment in high concentration since operation can be facilitated upon production of molded articles practically used and uniform mixing can be attained.

EXAMPLES

The present invention will be described in greater detail with reference to examples which are given merely by way of examples and should by no means be construed as limiting the present invention thereto.

EXAMPLE 1

In a 1,000 ml three-necked flask was charged 400 ml of mineral spirit, to which were added 140 g of aluminum pigment (high brightness grade flaky aluminum paste 725N produced by Showa Alumi Powder Co., Ltd.; metal content: 85.5% by weight, mean particle size: 22 $\mu$m) and 2.4 g of a double bond-containing carboxylic acid obtained by thermally copolymerizing acrylic acid and soybean oil fatty acid (DIACID, product by Harima Kasei Kogyo K. K.). After vigorously agitating the mixture at 90° C. for 1 hour with simultaneously introducing $N_2$ gas, the mixture was cooled to room temperature and filtered to obtain a thermally polymerized carboxylic acid-treated aluminum pigment. The amount of DIACID adsorbed on the aluminum was 2.2 g.

On the other hand, 30 ml of mineral spirit and 24 g of a red pigment (Colofine Red 236A, produced by Dainippon Ink and Chemicals, Inc.) and 0.48 g of a pigment dispersant (Homogenol L-100, produced by Kao Co., Ltd.) were introduced in a pot mill composed of a 250 ml glass bottle containing chrome steel balls of 6 mm in diameter, and the mixture was mixed by rotating the bottle at 30 rpm for 16 hours to disperse and grind the pigment.

Then, the aluminum pigment having adsorbed thereon the DIACID and the dispersed coloring pigment together with 80 ml of mineral spirit were introduced in a 500 ml three-necked flask and vigorously agitated at room temperature for 10 minutes while introducing $N_2$ gas in the flask to adsorb the coloring pigment on the surface of the DIACID. Excessive mineral spirit was filtered out to obtain primary red aluminum pigment.

The primary red aluminum pigment (2 g) and 100 g of low density polyethylene were kneaded together to give gorgeous red polyethylene having a metallic color touch.

EXAMPLE 2

A primary red aluminum pigment was produced by repeating the same procedures as in Example 1 except that the aluminum pigment having adsorbed thereon DIACID was charged in the pot mill in which the dispersion and grinding of red pigment had just been completed and the pot mill was rotated at 30 rpm for 3 minutes to adsorb the red pigment on the surface of the DIACID. Similar coloring tests to those in Example 1 were performed. As the result, it was confirmed that a polyethylene having a similar color touch to that obtained in Example 1 was obtained.

EXAMPLE 3

A primary orange aluminum pigment was produced by repeating the same procedures as in Example 1 except that a double bond-containing carboxylic acid prepared by the thermal polymerization of soybean oil fatty acid (FINE ACID DM, produced by Miyoshi Yushi K. K.) was used instead of DIACID, mineral spirit was substituted by xylene, and the red pigment was substituted by an orange pigment (Colofine Orange 320B, produced by Dainippon Ink and Chemicals, Inc.). Similar coloring tests to those in Example 1 were performed. As the result, it was confirmed that an orange polyethylene having an excellent metallic color touch was obtained.

EXAMPLE 4

A primary red aluminum pigment was produced by repeating the same procedures as in Example 1 except that high brightness grade flaky aluminum paste 574PS (metal content: 75.0% by weight, mean particle size: 13 $\mu$m) produced by Showa Alumi Powder Co., Ltd. was used as the aluminum pigment. The primary red aluminum pigment (5 parts by weight) was mixed 100 parts by weight of an acrylate-urethane resin paint (a product by Isamu Paint Co., Ltd., composed of 45 parts by weight of AU 21 Clear, 5 parts by weight of AU 21 hardener, and 50 parts by weight of AU 21 thinner), and the mixture was sprayed onto a steel plate of a size of 180 mm×50 mm. As the result, a red coating layer having a gorgeous metallic color touch was obtained.

EXAMPLE 5

A primary golden aluminum pigment was produced by repeating the same procedures as in Example 2 except that 150 ml of xylene, 24 g of a yellow pigment (Cinquasia Fast Gold YT-915-D, produced by Ciba-Geigy AG), and 0.48 g of a pigment dispersant (Homogenol L-100, produced by Kao, Co., Ltd.) were charged in a pot mill composed of a 250 ml glass bottle containing chrome steel balls of 3 mm in diameter. The primary golden aluminum pigment thus obtained was rendered water dispersible by adding thereto a nonionic surfactant. The water dispersible pigment (5 parts by weight) and 100 parts by weight of an acrylic emulsion printing adhesive (Bronze Binder, produced by Kabushiki Kaisha Sano) were kneaded. The resulting composition was screen printed on a white silk fabric, and as the result it was confirmed that gold color luster was obtained similar to that of the fabric on which gold powder was printed.

EXAMPLE 6

A primary blue aluminum pigment was produced by repeating the same procedures as in Example 1 except that a blue pigment (Colofine Blue 702A, produced by Dainippon Ink and Chemicals, Inc.) was used. The primary blue aluminum pigment thus obtained was subjected to similar tests as in Example 1. As the result, it was confirmed that a blue polyethylene having an excellent metallic color touch was obtained.

EXAMPLE 7

The primary red aluminum pigment produced in Example 1 (net: 150 g) without removing mineral spirit was introduced in a three-necked flask containing 1,600 ml of mineral spirit. Further, 3.0 g of acrylic acid was introduced in the flask, and the mixture was agitated at 60° C. for 15 minutes. Then, a solution of 30 g of trimethylolpropane trimethacrylate in 170 ml of mineral spirit and a solution of 4.2 g of azobisisobutyronitrile in 150 ml of mineral spirit were added to the mixture, and the resulting mixture was polymerized by elevating the temperature to 100° C. in 3 hours to coat the surface of the primary red aluminum pigment with the resin. The pigment was filtered to remove excessive mineral spirit to give a secondary red aluminum pigment.

The secondary red aluminum pigment (100 g) and 500 g of acrylic resin were suspended or dissolved in 350 g of toluene to prepare a red bright paint, which was coated on a steel plate of a size of 180 mm×50 mm to obtain test samples. The test samples was observed for its color and subjected to exposure tests to perform water resistance, alkali resistance and acid resistance. As the result, it was confirmed that the sample showed a gorgeous metallic red color and was excellent in resistance to water and chemicals.

EXAMPLE 8

A secondary red aluminum pigment was produced in the same manner as in Example 7 except that the primary red aluminum pigment produced in Example 2 was used instead of that produced in Example 1. Using the secondary red aluminum pigment, a paint was produced and tested in the same manner as in Example 7, and the same results as in Example 7 were obtained.

EXAMPLE 9

A primary golden aluminum pigment was produced in the same manner as in Example 5 except that no surfactant was added but excessive mineral spirit was removed by filtering.

Using the thus-obtained primary golden aluminum pigment, gravure print ink was prepared as follows.

| Formula | |
| --- | --- |
| Primary golden aluminum pigment | 15 parts by weight |
| Polyamide resin | 20 parts by weight |
| Toluene | 18 parts by weight |
| Ethyl alcohol | 14 parts by weight |
| Isopropyl alcohol | 23 parts by weight |

The above-described raw materials were introduced in a kneader and kneaded for 1 hour to obtain printing ink.

Upon use, 10 parts by weight of toluene and 10 parts by weight of ethyl alcohol were added to the ink composition to adjust its viscosity, and the mixture was printed on a polypropylene film using a gravure rotary press printer. In this case, bright print was obtained having golden metallic luster in each of line printing at a width of 0.5 mm, solid printing and half-tone printing.

EXAMPLE 10

The same procedures as in Example 7 were repeated using the primary golden aluminum pigment as produced in Example 9 instead of the primary red aluminum pigment to produce a secondary golden aluminum pigment.

Using the thus-obtained secondary golden aluminum pigment, ink for felt-tip markers was prepared as follows.

| Formula | |
| --- | --- |
| Secondary golden aluminum pigment | 35 parts by weight |
| Polymerized rosin | 16 parts by weight |
| Polymaleic acid resin | 5 parts by weight |
| Xylol | 15 parts by weight |
| n-Butyl alcohol | 5 parts by weight |
| Toluene | 10 parts by weight |
| Butyl acetate | 13 parts by weight |
| Surfactant | 1 part by weight |

The above-described raw materials were charged in a kneader, and the mixture was mixed by agitating it for 1 hour to disperse the secondary golden aluminum pigment to obtain ink for felt-tip markers.

When writing on art paper with a felt-tip marker using the thus-obtained ink, letters were written which had golden luster with brightness.

EXAMPLE 11

A primary red aluminum pigment was produced by repeating the same procedures as in Example 1, except that 100 g of an aluminum pigment (high brightness grade flaky aluminum paste 574PS produced by Showa Alumi Powder Co., Ltd.; metal content: 85.5% by weight) was used as the aluminum pigment. Then, the primary red aluminum pigment was treated in the same manner as in Example 7 to produce a secondary red aluminum pigment.

Using the secondary red aluminum pigment thus obtained, aqueous flexographic ink was produced as follows.

| Formula | |
| --- | --- |
| Secondary red aluminum pigment | 15 parts by weight |
| Ethyl cellulose | 30 parts by weight |
| Water | 43 parts by weight |
| Modified alcohol | 10 parts by weight |

-continued

| Formula | |
|---|---|
| Surfactant | 2 parts by weight |

The above-described raw materials were introduced in a kneader and kneaded for 6 hours to obtain flexographic ink in which the secondary red aluminum pigment was dispersed uniformly.

The ink was printed on a polypropylene film in the same manner as in Example 9. In this case, bright print was obtained having red metallic luster in each of line printing at a width of 0.5 mm, solid printing and halftone printing.

EXAMPLE 12

A secondary blue aluminum pigment was produced in the same manner as in Example 11 except that a blue pigment (Colofine Blue 702A, produced by Dainippon Ink and Chemicals, Inc.) was used instead of the red pigment.

Using the secondary blue aluminum pigment, aqueous ink for pens was produced as follows.

| | |
|---|---|
| Secondary blue aluminum pigment | 35 parts by weight |
| Gum arabic | 3 parts by weight |
| Polyvinyl alcohol | 1 part by weight |
| Glycerol | 1 part by weight |
| Surfactant | 5 parts by weight |
| Salicylic acid | 1 part by weight |
| Water | 54 parts by weight |

The above-described raw materials were introduced in a kneader and kneaded for 2 hours to obtain water soluble ink in which the secondary blue aluminum pigment was dispersed uniformly.

Writing letters on ordinary paper with a pen using the resulting aqueous ink, the written letters had blue metallic luster with brightness.

EXAMPLE 13

Using the secondary red aluminum pigment produced in Example 11, red bright ink for lettering was produced as follows.

| Formula | |
|---|---|
| Secondary red aluminum pigment | 35 parts by weight |
| Rosin-modified polymaleic acid | 15 parts by weight |
| Ethyl cellulose | 8 parts by weight |
| Isopropyl alcohol | 15 parts by weight |
| Ethyl cellosolve | 22 parts by weight |
| Butyl acetate | 8 parts by weight |
| Toluene | 8 parts by weight |
| Surfactant | 1 part by weight |

The above-described raw materials were introduced in a kneader and kneaded for 1 hour to obtain red bright ink. Using the ink, lines were drawn with a lettering pen. The lines had red metallic luster with brightness.

EXAMPLE 14

A primary golden aluminum pigment was produced by repeating the same procedures as in Example 1 except that the aluminum pigment was replaced by 168 g of an aluminum pigment (flaky aluminum paste; metal content: 71.5%, mean grain size: 70 μm), mineral spirit and the red pigment were replaced by 150 ml of xylene and 24 g of a yellow pigment (Cinquasia Fast Gold YT-915-D, produced by Ciba-Geigy AG) and the amount of the pigment dispersant was changed to 0.28 g.

Without filtration, 10 parts by weight of the resulting primary golden aluminum pigment was mixed with 100 parts by weight of polystyrene chip, and the mixture obtained was molded at 220° C. using an injection molding machine to produce for trial a body of radio cassette recorders. The body thus produced contained the primary golden aluminum pigment well dispersed and showed gorgeous golden luster.

EXAMPLE 15

The same procedures as in Example 7 were repeated except that the primary red aluminum pigment was replaced by the primary golden aluminum pigment produced in Example 14 and the amount of acrylic acid and that of azobisisobutyronitrile were changed to 2.4 g and 3.4 g, respectively, to obtain a secondary golden aluminum pigment.

A mixture of 15 parts by weight of the secondary golden aluminum pigment and 100 parts by weight of polystyrene chip was injection molded in the same manner as in Example 14 to obtain a body of radio cassette recorders. The article obtained contained the secondary golden aluminum pigment well dispersed, and showed gorgeous golden luster similar to that obtained in Example 14.

EXAMPLE 16

A mixture of 20 parts by weight of the secondary golden aluminum pigment produced in Example 15 and 100 parts by weight of low density polyethylene (LDPE) chip was molten and cast on a glass plate coated with a mold release agent and cooled to produce a thick plate having gorgeous golden luster.

EXAMPLE 17

A primary blue aluminum pigment was produced in the same manner as in Example 14 except that 6 ml of xylene, 4.8 g of a blue pigment (Colofine Blue 702A, produced by Dainippon Ink & Chemicals, Ink.) and 0.1 g of a pigment dispersant were used, and a secondary blue aluminum pigment was produced in the same manner as in Example 15.

A mixture of 1 part by weight of the secondary blue aluminum pigment and 100 parts by weight of a polycarbonate resin was extruded to produce for trial a jug. Bright blue powder was dispersed in the entire jug, and the jug had a good transparency and brightness.

EXAMPLE 18

A primary golden aluminum pigment was produced by repeating the same procedures as in Example 1 except that the aluminum pigment was replaced by 105 g of a high grade flaky aluminum paste 574PS (metal content: 75.0% by weight, mean particle size: 13 μm) produced by Showa Alumi Powder Co., Ltd. was used as the aluminum pigment., the red pigment was replaced by 16 g of a yellow pigment (Cinquasia Fast Gold YT-915-D, produced by Ciba-Geigy AG) and the amount of the pigment dispersant was changed to 0.32 g.

Using the primary golden aluminum pigment (net: 100 g), a secondary golden pigment was produced in the same manner as in Example 7.

A mixture of 15 parts by weight of the secondary golden aluminum pigment and 100 parts by weight of high density polyethylene (HDPE) beads was molded by blowing to produce a transparent golden HDPE film.

EXAMPLE 19

A secondary red aluminum pigment was produced in the same manner as in Example 7, and a mixture of 15 parts by weight of the secondary red aluminum pigment and 100 parts by weight of polyethylene terephthalate was molded by extrusion to produce a container having bright red color.

EXAMPLE 20

A primary golden metallic pigment was produced in the same manner as in Example 5 except that no surfactant was added but the aluminum pigment having adsorbed thereon DIACID was charged in the pot mill where dispersion and grinding of the yellow pigment had just been completed, and the pot mill was rotated at a speed of 30 rpm for 3 minutes to have the yellow pigment adsorbed on the surface of the DIACID, followed by removing excessive mineral spirit from the mixture by filtration. Thus, 200 g of a primary golden aluminum pigment (non-volatile content: 68%) was obtained.

The primary golden aluminum pigment thus obtained was blended with a binder and a solvent shown in Table 1 below.

TABLE 1

| Sample 1A: Alkyd Melamine Resin Paint: | |
| --- | --- |
| Primary golden aluminum pigment | 5 parts by weight |
| Phthalic acid varnish | 60 parts by weight |
| Melamine resin varnish | 40 parts by weight |

EXAMPLE 21

The primary golden aluminum pigment produced in Example 20 was treated in the same manner as in Example 7 to produce a secondary golden aluminum pigment.

The thus produced secondary golden aluminum pigment was blended with a binder and a solvent shown in Table 2 below to obtain a bright paint.

TABLE 2

| Sample 2A: Phenol Resin Paint | |
| --- | --- |
| Secondary golden aluminum pigment | 10 parts by weight |
| Phenol resin | 50 parts by weight |
| Linseed oil | 50 parts by weight |
| Sample 2B: Thermoplastic Acrylic Resin Paint | |
| Secondary golden aluminum pigment | 5 parts by weight |
| Methyl methacrylate resin | 90 parts by weight |
| DBP (plasticizer) | 10 parts by weight |
| Sample 2C: Varnish | |
| Secondary golden aluminum pigment | 10 parts by weight |
| Varnish | 100 parts by weight |
| Thinner | 10 parts by weight |

EXAMPLE 22

A primary red aluminum pigment was produced in the same manner as in Example 1. This was treated in the same manner as in Example 7 to obtain a secondary red aluminum pigment.

The secondary red aluminum pigment thus obtained was blended with a binder and a solvent shown in Table 3 below to produce a bright paint.

TABLE 3

| Sample 3A: Lacquer Enamel | |
| --- | --- |
| Secondary red aluminum pigment | 5 parts by weight |
| Phthalic acid varnish | 44 parts by weight |
| Dibutyl phthalate | 1 part by weight |
| Nitrocellulose varnish | 30 parts by weight |
| Amino resin varnish | 10 parts by weight |
| Sample 3B: Melamine Resin Paint | |
| Secondary red aluminum pigment | 10 parts by weight |
| Alkyd melamine resin | 80 parts by weight |
| Xylene | 10 parts by weight |
| Sample 3C: Amide Resin Paint | |
| Secondary red aluminum pigment | 3 parts by weight |
| Polyamide resin | 30 parts by weight |
| Ethyl acetate | 10 parts by weight |
| Industrial alcohol | 20 parts by weight |

EXAMPLE 23

A primary blue aluminum pigment was produced by repeating the same procedures as in Example 22 except that a blue pigment (Colofine Blue 702A, produced by Dainippon Ink and Chemicals, Inc.) was used instead of the red pigment, and a secondary blue aluminum pigment was produced therefrom.

The secondary blue aluminum pigment thus obtained was blended with a binder and a solvent shown in Table 4 below to produce a bright paint.

TABLE 4

| Sample 4A: Phthalic Acid Resin Enamel | |
| --- | --- |
| Secondary blue aluminum pigment | 5 parts by weight |
| Long oil phthalic acid resin varnish | 73 parts by weight |
| Desiccant | 2 parts by weight |
| Anti-skinning agent | 0.1 part by weight |
| Sample 4B: Lacquer | |
| Secondary blue aluminum pigment | 20 parts by weight |
| Clear lacquer | 80 parts by weight |
| Sample 4C: Alkyd Resin Paint | |
| Secondary blue aluminum pigment | 20 parts by weight |
| Nitrocellulose | 100 parts by weight |
| Alkyd resin | 100 parts by weight |
| Industrial alcohol | 200 parts by weight |
| DBP | 20 parts by weight |

EXAMPLE 24

A primary red aluminum pigment was produced by repeating the same procedures as in Example 22 except that 105 g of high brightness grade flaky aluminum paste 574PS (metal content: 75.0% by weight, mean particle size: 13 μm) produced by Showa Alumi Powder Co., Ltd. was used as the aluminum pigment, and then a secondary red aluminum pigment was produced from the primary red aluminum pigment in the same manner as in Example 22.

The secondary red aluminum pigment (10 parts by weight) was mixed with 90 parts by weight of an acrylic resin paint to obtain a bright acrylic resin paint.

EXAMPLE 25

A primary golden aluminum pigment was prepared by repeating the same procedures as in Example 1 except that 168 g of an aluminum pigment (coarse grain high brightness grade flake aluminum paste produced by way of trial; metal content: 71.5% by weight, mean grain size: 70 μm) was used instead of the aluminum paste 725N, that mineral spirit was replaced by 150 ml of xylene and the red pigment was replaced by 14 g of the same yellow pigment as used in Example 5, and that the amount of the pigment dispersant was changed to 0.28 g.

Using the primary golden aluminum pigment, a secondary golden aluminum pigment was produced in the same manner as in Example 7 except that the amount of acrylic acid was changed to 2.4 g, and that the amounts of trimethylolpropane trimethacrylate and of azobisisobutyronitrile were changed to 24 g and 3.4 g, respectively.

The thus obtained secondary golden aluminum pigment (5 parts by weight) was blended with 80 parts by weight of vinyl chloride-vinyl acetate copolymer, 10 parts of DOP and 2 parts by weight of an organic tin stabilizer to a bright vinyl chloride-vinyl acetate copolymer paste.

COMPARATIVE EXAMPLES

For comparison, paints having the same recipe as those of the present invention described above except that the pigment was replaced by conventional ones were produced as follows.

COMPARATIVE EXAMPLE 1

Using 2 parts by weight of ERUJII #150R Gold, a pigment produced by Oike Kogyo Co., Ltd. as a pigment instead of the secondary golden aluminum pigment, a vinyl chloride-vinyl acetate copolymer resin paint was produced by blending the pigment with 80 parts by weight of vinyl chloride-vinyl acetate copolymer, 10 parts by weight of DOP and 2 parts by weight of organic tin stabilizer in the same manner as in Example 25.

COMPARATIVE EXAMPLE 2

Using 2 parts by weight of ERUJII #325 Red, a pigment produced by Oike Kogyo Co., Ltd., as a pigment instead of the secondary red aluminum pigment, a lacquer enamel was produced by blending the pigment with 44 parts by weight of phthalic acid varnish, 1 part by weight of dibutyl phthalate, 30 parts by weight of nitrocellulose varnish and 10 parts by weight of amino resin varnish in the same manner as in Example 22 (Sample 3A).

COMPARATIVE EXAMPLE 3

The same procedures as in Example 23 (Sample 4B) were repeated except that instead of the secondary blue aluminum pigment 8 parts by weight of ERUJII #325 Blue, a pigment produced by Oike Kogyo Co., Ltd., was blended with 80 parts by weight of clear lacquer

Tests on Thermally Resistance and Accelerated Weatherability

Dry paint films of the bright paints obtained in Examples 22 (Sample 3A), 23 (Sample 4B) and 25, and comparative paints obtained in Comparative Examples 1 to 3 were tested to examine their thermally resistance and weatherability as follows.

(a) Thermally Resistance Test

The paints of the present invention produced according to Examples 22 (Sample 3A), 23 (Sample 4B) and 25, and the comparative paints of Comparative Examples 1 to 3 were coated on tin plates for tests, each having a size of 6 cm × 12 cm, respectively, to obtain coated plates for thermally resistance tests. The coated plates were subjected to thermally resistance test by standing them at 200° C. for 1 hour, and 60° luster before and after the test and color tone (L, a and b values) were determined. For the determination of color tones, there was used WEL-SUN-HC type, a sun shine weather meter, which is a sun shine carbon arc lamp weather meter produced by Suga Shikenki Co., Ltd. The results obtained are shown in Table 5 below.

TABLE 5

| Sample | Color of Coated Plate | Measurement Timing | 60° Luster | 60° Luster Retention (%) | Color Tone L | a | b | Color Difference ΔE |
|---|---|---|---|---|---|---|---|---|
| Ex.16 | Red | Before test | 33.4 | 79 | 53.46 | 7.72 | −3.29 | 1.0 |
|  |  | After test | 26.5 |  | 53.65 | 7.70 | −4.30 |  |
| Ex.17 | Blue | Before test | 25.7 | 89 | 54.03 | −10.40 | −13.95 | 6.7 |
|  |  | After test | 22.9 |  | 50.85 | −8.43 | −8.40 |  |
| Ex.19 | Golden | Before test | 12.5 | 80 | 59.16 | −1.94 | 24.54 | 2.8 |
|  |  | After test | 10.0 |  | 58.88 | −1.75 | 21.74 |  |
| Comp. Ex.1 | Golden | Before test | 27.1 | 50 | 50.40 | 0.10 | 21.78 | 7.9 |
|  |  | After test | 13.6 |  | 52.15 | 7.83 | 21.69 |  |
| Comp. Ex.2 | Red | Before test | 19.6 | 50 | 33.33 | 33.75 | 13.98 | 4.5 |
|  |  | After test | 9.9 |  | 32.71 | 29.73 | 12.05 |  |
| Comp. Ex.3 | Blue | Before test | 17.9 | 54 | 44.12 | 17.04 | −29.37 | 12.6 |
|  |  | After test | 9.7 |  | 42.41 | 17.02 | −16.93 |  |

$$60° \text{ Luster Retention Ratio (\%)} = \frac{60° \text{ Luster After Test}}{60° \text{ Luster Before Test}} \times 100$$

$\Delta E = ((L_{bt} - L_{at})^2 + (a_{bt} - b_{at})^2 + (b_{bt} - b_{at})^2)^{\frac{1}{2}}$ where subscript "at" stands for "after test" and "bt" for "before test".

From the results shown in Table 5, it can be seen that the bright paints of the present invention each shows much less change with respect to 60° luster and color tone, and they are excellent in heat resistance as compared with the comparative paints containing the conventional pigments.

Accelerated Weatherability Test

The same paints as used in the heat resistance tests were coated on heat resistant polyvinyl chloride resin plates, each having a size of 6 cm × 6 cm. Using the same weather meter as used in the heat resistance tests, accelerated weatherability tests were performed at room temperature for 200 hours, and 60° luster and color tone (L, a and b values) were determined. The results obtained are shown in Table 6 below.

TABLE 6

| Sample | Color of Coated Plate | Measurement Timing | 60° Luster | 60° Luster Retention (%) | Color Tone L | a | b | Color Differrence ΔE |
|---|---|---|---|---|---|---|---|---|
| Ex.16 | Red | Before test | 33.4 | 93 | 53.46 | 7.72 | −3.29 | 1.6 |
| (Sample 3A) | | After test | 31.0 | | 52.59 | 7.48 | −1.96 | |
| Ex.17 | Blue | Before test | 25.7 | 97 | 54.03 | −10.40 | −13.95 | 2.4 |
| (Sample 4B) | | After test | 24.8 | | 52.24 | −10.12 | −12.35 | |
| Ex.19 | Golden | Before test | 12.5 | 100 | 59.16 | −1.94 | 24.54 | 1.1 |
| | | After test | 12.5 | | 58.28 | −1.63 | 23.96 | |
| Comp. Ex.1 | Golden | Before test | 27.1 | 84 | 59.30 | 0.10 | 21.78 | 4.4 |
| | | After test | 22.8 | | 56.50 | 2.83 | 19.67 | |
| Comp. Ex. 2 | Red | Before test | 19.8 | 51 | 35.33 | 28.71 | 19.08 | 9.3 |
| | | After test | 10.1 | | 33.36 | 37.43 | 12.59 | |
| Comp. Ex. 3 | Blue | Before test | 17.9 | 62 | 44.12 | 17.04 | −29.37 | 7.0 |
| | | After test | 11.1 | | 40.63 | 14.26 | −24.02 | |

60° Luster Retention Ratio (%) = $\frac{60° \text{ Luster After Test}}{60° \text{ Luster Before Test}} \times 100$ $\Delta E = ((L_{bt} - L_{at})^2 + (a_{bt} - b_{at})^2 + (b_{bt} - b_{at})^2)^{\frac{1}{2}}$ where subscript "at" stands for "after test" and "bt" for "before test".

From the results shown in Table 6, it can be seen that much less change is observed in both the characteristics tested and the weatherability of the paints of the present invention is excellent as compared with the comparative samples containing the conventional pigments.

As stated above, each of the comparative compositions suffer deterioration of the characteristics after the tests while the composition of the present invention have excellent heat resistance and weatherability.

What is claimed is:

1. A primary colored metallic pigment comprising a metallic pigment in the form of a flaky grain, a coloring pigment, and a thermally polymerized carboxylic acid having at least one double bond and at least two carboxylic groups prepared by the thermal polymerization of at least one double bond-containing carboxylic acid, the coloring pigment being chemically adsorbed on the surface of the metallic pigment via the thermally polymerized carboxylic acid.

2. The primary colored metallic pigment as claimed in claim 1, wherein said metallic pigment is at least one member selected from the group consisting of Al, Zn, Fe, Ni, Sn, Cu and Ag, and their alloys.

3. The primary colored metallic pigment as claimed in claim 2, wherein said metallic pigment is at least one member selected from the group consisting of Al and its alloys.

4. The primary colored metallic pigment as claimed in claim 1, wherein said grain has a mean grain size of from 1 to 200 μm and a mean thickness of from 0.1 to 5 μm.

5. The primary colored metallic pigment as claimed in claim 1, wherein said coloring pigment is an organic pigment.

6. The primary colored metallic pigment as claimed in claim 1, wherein said coloring pigment is an inorganic pigment.

7. The primary colored metallic pigment as claimed in claim 1, wherein said thermally polymerized carboxylic acid is a member selected from the group consisting of a thermally polymerized product obtainable by the thermal polymerization of linseed oil fatty acid, a thermally polymerized product obtainable by thermally polymerized soybean oil fatty acid, a thermally polymerized product obtainable by the thermal polymerization of linseed oil fatty acid and acrylic acid, and a thermally polymerized product obtainable by the thermal polymerization of a soybean oil fatty acid and acrylic acid.

8. The primary colored metallic pigment as claimed in claim 1, wherein said thermally polymerized carboxylic acid is from 0.2 to 10 parts by weight per 100 parts by weight of said metallic pigment.

9. The primary colored metallic pigment as claimed in claim 8, wherein said thermally polymerized carboxylic acid is from 1 to 6 parts by weight per 100 parts by weight of said metallic pigment.

10. A secondary colored metallic pigment comprising
   (i) a primary colored metallic pigment comprising a metallic pigment, a coloring pigment, and a thermally polymerized carboxylic acid having at least one double bond and at least two carboxylic groups prepared by the thermal polymerization of at least one double bond-containing carboxylic acid, the coloring pigment being chemically adsorbed on the surface of the metallic pigment via the thermally polymerized carboxylic acid, and
   (ii) a polymer composed of a radical polymerizable unsaturated carboxylic acid and a monomer having at least three radical polymerizable double bonds, the primary colored metallic pigment being coated with the polymer.

11. The secondary colored metallic pigment as claimed in claim 10, wherein said metallic pigment is at least one member selected from the group consisting of Al, Zn, Fe, Ni, Sn, Cu and Ag, and their alloys.

12. The secondary colored metallic pigment as claimed in claim 10, wherein said metallic pigment is at least one member selected from the group consisting of Al and its alloys.

13. The secondary colored metallic pigment as claimed in claim 10, wherein said metallic pigment is in the form of flaky grain.

14. The secondary colored metallic pigment as claimed in claim 13, wherein said grain has a mean grain size of from 1 to 200 μm and a mean thickness of from 0.1 to 5μm.

15. The secondary colored metallic pigment as claimed in claim 10, wherein said coloring pigment is an organic pigment.

16. The secondary colored metallic pigment as claimed in claim 10, wherein said coloring pigment is an inorganic pigment.

17. The secondary colored metallic pigment as claimed in claim 10, wherein said thermally polymerized carboxylic acid is a member selected from the group consisting of a thermally polymerized product obtainable by the thermal polymerization of linseed oil fatty acid, a thermally polymerized product obtainable by thermally polymerized soybean oil fatty acid, a thermally polymerized product obtainable by the thermal polymerization of linseed oil fatty acid and acrylic acid, and a thermally polymerized product obtainable by the thermal polymerization of a soybean oil fatty acid and acrylic acid.

18. The secondary colored metallic pigment as claimed in claim 10, wherein said thermally polymerized carboxylic acid is from 0.2 to 10 parts by weight per 100 parts by weight of said metallic pigment.

19. A method for the production of a primary colored metallic pigment, comprising
  a) agitating a thermally polymerized carboxylic acid having at least one double bond and at least two carboxylic groups prepared by the thermal polymerization of at least one double bond-containing carboxylic acid, and a metallic pigment in an organic solvent, for from 30 minutes to 5 hours,
  b) heating up the mixture from about 50° C. to about 150° C. and filtering the mixture to obtain a cake,
  c) cooling down the temperature of the mixture to room temperature and mixing the cake and a coloring pigment by kneading or agitating the cake and the coloring pigment in an organic solvent, and
  d) removing excessive organic solvent.

20. A method for the production of a secondary colored metallic pigment, comprising
  a) agitating a thermally polymerized carboxylic acid having at least one double bond and at least two carboxylic groups prepared by the thermal polymerization of at least one double bond-containing carboxylic acid, and a metallic pigment in an organic solvent, for from 30 minutes to 5 hours,
  b) heating up the mixture from about 50° C. to about 150° C. and filtering the mixture to obtain a cake,
  c) cooling down the temperature of the mixture to room temperature and mixing the cake and a coloring pigment by kneading or agitating the cake and the coloring pigment in an organic solvent,
  d) adding a radical polymerizable unsaturated carboxylic acid to the mixture while dispersing and agitating the mixture in an organic solvent,
  e) adding a monomer having at least three radical polymerizable unsaturated double bonds and a polymerization initiator to the mixture and polymerizing the resulting mixture, and
  f) removing excessive organic solvent.

* * * * *